(12) United States Patent
Liu et al.

(10) Patent No.: US 12,443,777 B2
(45) Date of Patent: Oct. 14, 2025

(54) OPTIMIZING METHOD FOR MOLDING PROCESS OF FIBER-REINFORCED POLYMER COMPOSITE PARTS

(71) Applicants: NORTH UNIVERSITY OF CHINA, Taiyuan (CN); SHANXI ZHONGBEI NEW MATERIAL TECHNOLOGY CO., LTD., Taiyuan (CN)

(72) Inventors: Yaqing Liu, Taiyuan (CN); Qihui Chen, Taiyuan (CN); Chaoyang Wu, Taiyuan (CN); Yong Gao, Taiyuan (CN); Guizhe Zhao, Taiyuan (CN)

(73) Assignees: NORTH UNIVERSITY OF CHINA, Taiyuan (CN); SHANXI ZHONGBEI NEW MATERIAL TECHNOLOGY CO., LTD., Taiyuan (CN)

( * ) Notice: Subject to any disclaimer, the term of this patent is extended or adjusted under 35 U.S.C. 154(b) by 0 days.

(21) Appl. No.: 18/970,895

(22) Filed: Dec. 6, 2024

(65) Prior Publication Data

US 2025/0094672 A1    Mar. 20, 2025

Related U.S. Application Data

(63) Continuation of application No. PCT/CN2024/102344, filed on Jun. 28, 2024.

(30) Foreign Application Priority Data

Jun. 19, 2024   (CN) .......................... 202410791899.7

(51) Int. Cl.
*G06F 30/23*  (2020.01)
*G06N 3/126*  (2023.01)
(Continued)

(52) U.S. Cl.
CPC ............. *G06F 30/23* (2020.01); *G06N 3/126* (2013.01); *G06F 2111/06* (2020.01);
(Continued)

(58) Field of Classification Search
CPC .. G06F 30/23; G06F 2119/08; G06F 2111/06; G06F 2113/26; G06F 2113/22; G06N 3/126
See application file for complete search history.

(56) References Cited

U.S. PATENT DOCUMENTS 6,853,925 B2 * 2/2005 Daniel ............... G01N 15/0826
                                                702/35
10,599,791 B2 * 3/2020 Tranquart ............... G06F 30/23
(Continued)

FOREIGN PATENT DOCUMENTS

CN    101089754 A    12/2007
CN    112632813 A    4/2021
(Continued)

OTHER PUBLICATIONS

R. Mathur, S. G. Advani, B. K. Fink, "Optimization of Gate and Vent Locations for Resin Infusion Processes Using Genetic Algorithms", pp. 2176-2180, Jun. 1998 (Year: 1998).*
(Continued)

*Primary Examiner* — Kibrom K Gebresilassie

(57) ABSTRACT

An optimizing method for a molding process of a part made of a fiber-reinforced polymer composite is provided. A finite element method is adopted to perform thermochemical analysis of a macroscopic model of the part and thermomechanics analysis of a microscopic model of the part, so as to simulate temperature gradient, curing degree, and residual stress of the part during the molding process. A genetic algorithm is executed, with simultaneous minimization of temperature gradient, molding time, and residual stress as an
(Continued)

optimization goal and a curing process curve as a parameter variable, to achieve the simultaneous multi-objective optimization of molding process parameters, so as to obtain an optimized molding process.

**7 Claims, 5 Drawing Sheets
(2 of 5 Drawing Sheet(s) Filed in Color)**

(51) Int. Cl.
 *G06F 111/06* (2020.01)
 *G06F 113/22* (2020.01)
 *G06F 113/26* (2020.01)
 *G06F 119/08* (2020.01)
(52) U.S. Cl.
 CPC ...... *G06F 2113/22* (2020.01); *G06F 2113/26* (2020.01); *G06F 2119/08* (2020.01)

(56) References Cited

U.S. PATENT DOCUMENTS

| | | | |
|---|---|---|---|
| 2018/0297268 A1* | 10/2018 | Edward | B29C 51/12 |
| 2023/0058453 A1* | 2/2023 | Chou | B29C 70/48 |
| 2024/0051242 A1 | 2/2024 | Harik et al. | |

FOREIGN PATENT DOCUMENTS

| | | |
|---|---|---|
| CN | 113011060 A | 6/2021 |
| CN | 116631549 A | 8/2023 |

OTHER PUBLICATIONS

A. Shojaei, S.R. Ghaffarian, "Modeling and Simulation Approaches in the Resin Transfer Molding Process: A Review", pp. 525-544, 2003 (Year: 2003).*

* cited by examiner

OPTIMIZING METHOD FOR MOLDING PROCESS OF FIBER-REINFORCED POLYMER COMPOSITE PARTS

CROSS-REFERENCE TO RELATED APPLICATIONS

This application is a continuation of International Patent Application No. PCT/CN2024/102344, filed on Jun. 28, 2024, which claims the benefit of priority from Chinese Patent Application No. 202410791899.7, filed on Jun. 19, 2024. The content of the aforementioned application, including any intervening amendments thereto, is incorporated herein by reference in its entirety.

TECHNICAL FIELD

This application relates to molding of fiber-reinforced polymer composite parts, and more particularly to an optimizing method for a molding process of a fiber-reinforced polymer composite part.

BACKGROUND

The rapid development of science and technology has greatly promoted the expansion of the market demand and application of fiber-reinforced polymer composites. However, the application and development of fiber-reinforced composites are still seriously limited by cost and performance. The total cost is dominated by raw material costs and manufacturing costs, where the manufacturing costs account for more than 75% of the total cost. The performance of fiber-reinforced polymer composites mainly depends on material composition and manufacturing technique (including molding process, curing conditions, and post-processing process, etc.), which together determine the structure of individual layers and final performance of the composite. Therefore, how to simultaneously improve the manufacturing quality and reduce the production cost is an urgent problem to be solved in the field of fiber-reinforced polymer composite parts.

At present, the optimization of the molding process of fiber-reinforced polymer composites mainly relies on engineer's experience and the trial-and-error testing, both of which have some obvious deficiencies, such as lack of theoretical support, high cost, and long cycle. Therefore, it is of great practical significance to develop an economical and efficient optimization method for the molding process of fiber-reinforced polymer composite parts, so as to simultaneously reduce the manufacturing cost and improve the quality of molded parts.

SUMMARY

An object of the disclosure is to provide an optimizing method for a molding process of a fiber-reinforced polymer composite part, so as to simultaneously reduce the manufacturing cost and improve the molding part quality. This application adopts a finite element method to perform the thermochemical analysis in a macroscopic model of the part and the thermomechanics analysis in a microscopic model of the part, so as to simulate temperature gradient, curing degree, and residual stress of the part during the molding process. Subsequently, a genetic algorithm is executed, with the minimization of molding time, temperature gradient, and residual stress as optimization goals and curing curve as a parameter variable, to achieve the simultaneous multi-objective optimization of molding process parameters, so as to arrive at an efficient molding process for high-quality parts.

In order to achieve the above object, the following technical solutions are adopted.

This application provides an optimizing method for a molding process of a part made of a fiber-reinforced polymer composite, comprising:

(S1) establishing a Python library required for calculation; wherein the Python library comprises an Abaqus library and a genetic algorithm library, and the Abaqus library comprises an abaquesConstants library, a caeModules library, and an odb Access library;

(S2) setting simultaneous minimization of molding time, temperature gradient, and residual stress as an optimization goal;

(S3) setting a variable interval for holding temperature, heating rate, and cooling rate among molding process parameters; and respectively assigning values to the holding temperature, heating rate, and cooling rate using a random function;

(S4) establishing a macroscopic thermochemical model of the part according to dimensions and molding environment of the part by using a finite element method, and assigning a material property to the macroscopic thermochemical model; analyzing evolution of temperature and curing degree of the fiber-reinforced polymer composite during the molding process of the part by using a heat transfer analysis module; rewriting the macroscopic thermochemical model into a thermochemical model function of the molding process parameters, wherein a temperature boundary is applied by transmitting curing process parameters to a first subroutine, and the curing process parameters are randomly generated; importing the first subroutine followed by job submission; extracting a minimum curing degree in the macroscopic thermochemical model from the calculation results; calculating a maximum temperature gradient during the molding process; and exporting temperature-time data at a center of the part;

(S5) establishing a two-dimensional representative volume element (RVE) model by using a Python script based on the proportion of individual components and size of a fiber in the fiber-reinforced polymer composite; analyzing an elastic modulus change of a resin of the fiber-reinforced polymer composite during the molding process by using a cure hardening instantaneous linear elastic (CHILE) model; analyzing stress and strain transformations during the molding process by using a static general module; rewriting a microscopic thermomechanics model in the two-dimensional RVE model into a thermomechanics model function of the curing process parameters and simultaneously incorporating the temperature-time data exported in step (S4) into the two-dimensional RVE model as a predefined field; importing a second subroutine followed by job submission, wherein the second subroutine is an Abaqus user subroutine; and extracting the residual stress from calculation results of Abaqus;

(S6) calculating a total time of the molding process; wherein the total time comprises a heating time, a holding time, and a cooling time;

(S7) writing a dynamic penalty function, and evaluating a violation-constrained molding process parameter among the molding process parameters using the dynamic penalty function;

(S8) writing a main function of a genetic algorithm, defining a population size, the number of generations, a crossover distribution index, and a mutation distribution index; and calling the thermochemical model function, the thermomechanics model function, and the dynamic penalty function to evaluate individual fitness; and (S9) plotting a multi-objective optimized Pareto optimal solution set according to the individual fitness, and selecting a set of molding process parameters satisfying actual needs from multiple sets of molding process parameters provided by the multi-objective optimized Pareto optimal solution set, so as to generate an optimized molding process.

In some embodiments, in step (S4), the first subroutine is DISP, HETVAL, and USDFLD.

In some embodiments, in step (S5), the Abaqus user subroutine is UMAT, USDFLD, and UEXPAN.

In some embodiments, in step (S8), the genetic algorithm is a non-dominated sorting genetic algorithm II (NSGA-II).

In some embodiments, the resin is selected from the group consisting of an epoxy resin, a furan resin, a cyanate ester resin, a silicone resin, a phenolic resin, and a combination thereof.

In some embodiments, the fiber is selected from the group consisting of a carbon fiber, a quartz fiber, an aramid fiber, a metal fiber, and a combination thereof.

In some embodiments, the molding process is a compression molding process or a resin transfer molding process.

Compared to the prior art, the present disclosure has the following beneficial effects.

(1) The present disclosure adopts the effective combination of the finite element and the genetic algorithm to optimize the molding process of the part, reduce the temperature gradient and residual stress of the part during the molding process and shorten the molding time, which can simultaneously reduce the manufacturing cost and improve the quality of the molded part.

(2) Compared to the engineer's experience and the trial-and-error testing in the prior art, the method provided in this application is more effective and simpler, and can effectively solve the problems in the prior art such as lack of theoretical support, high cost, and long cycle.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated into and constitute a part of this specification, are intended to illustrate the embodiments of the disclosure, and are used for explaining the principles of the disclosure in conjunction with the specification.

In order to illustrate the technical solutions in the embodiments of the present disclosure or in the prior art more clearly, the drawings needed in the description of embodiments or the prior art will be briefly introduced below. Obviously, for those of ordinary skill in the art, other drawings can be obtained based on these drawings without exerting creative efforts.

Figure 1:
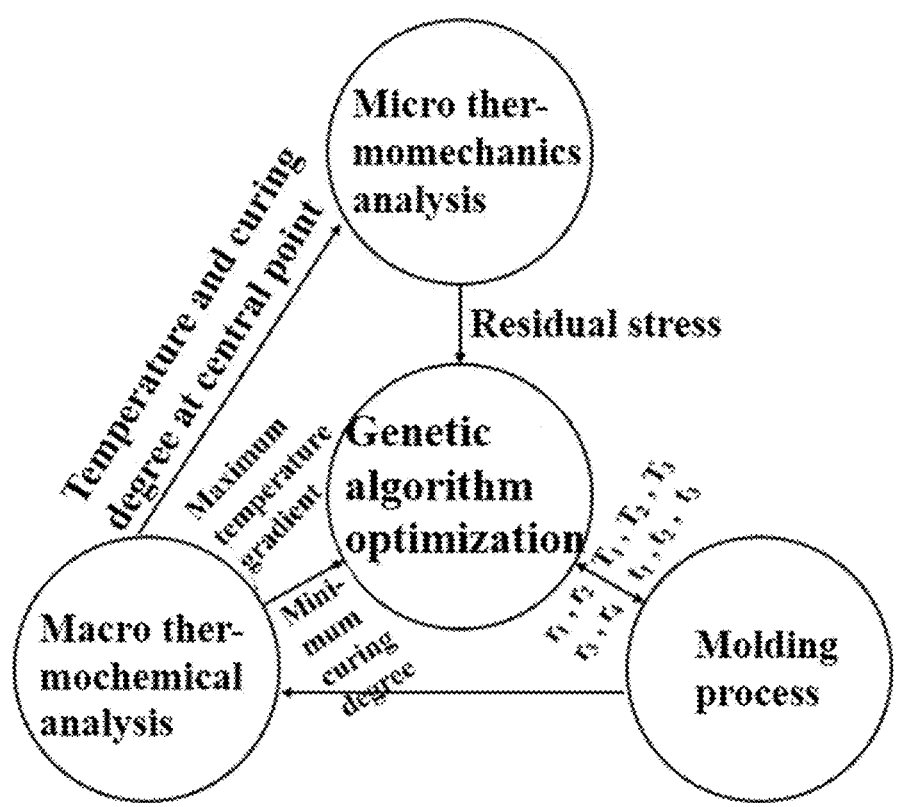
Figure 2:
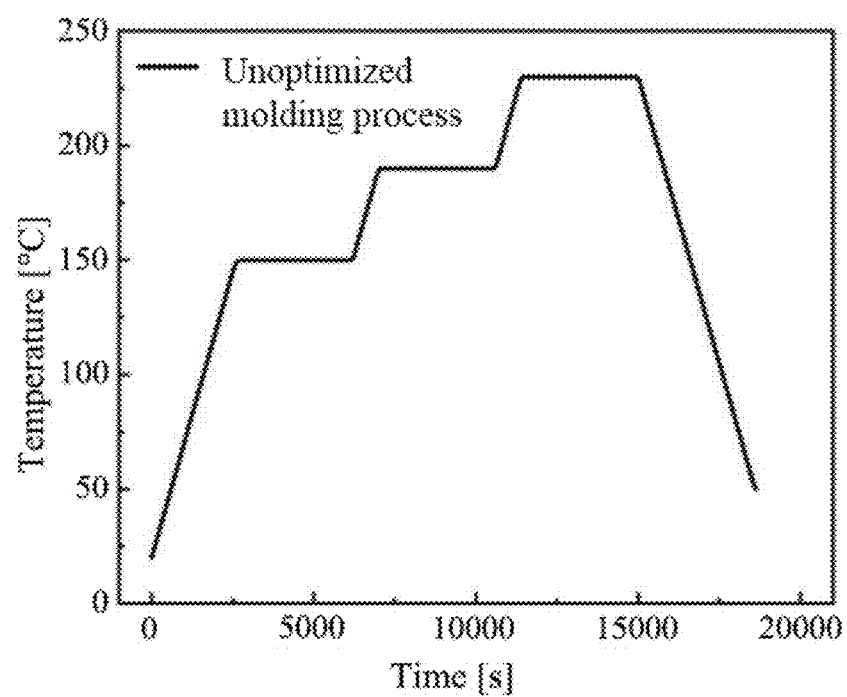
Figure 3:
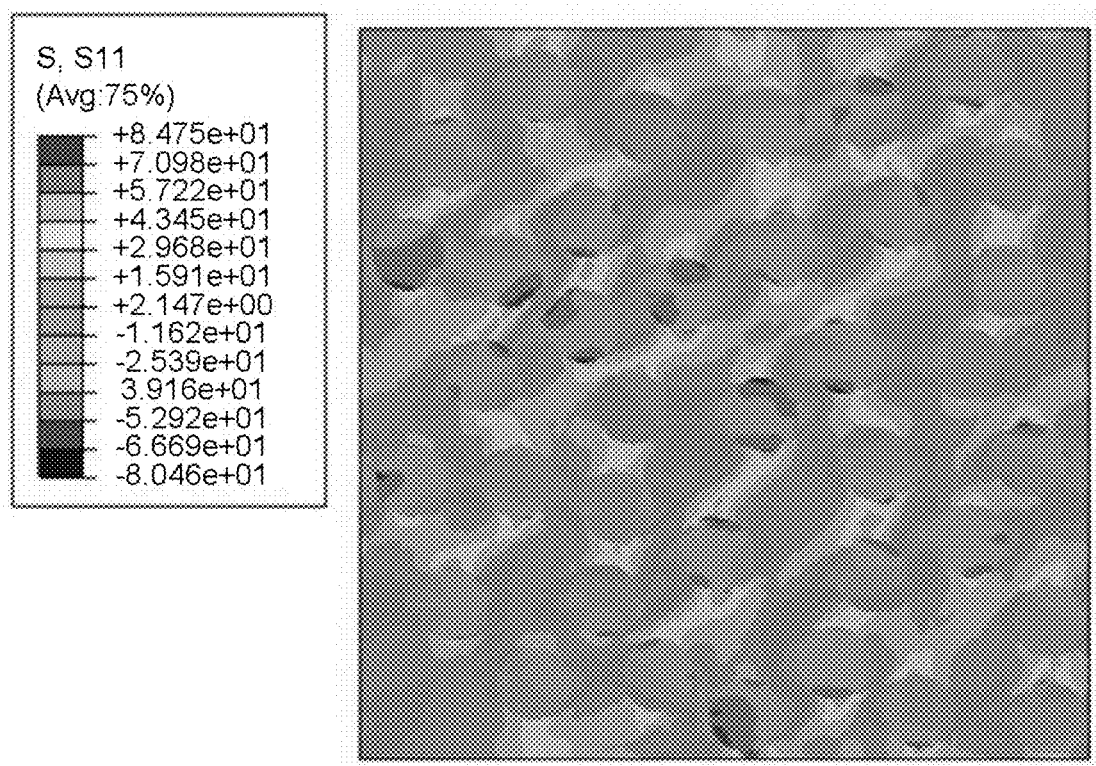
Figure 4:
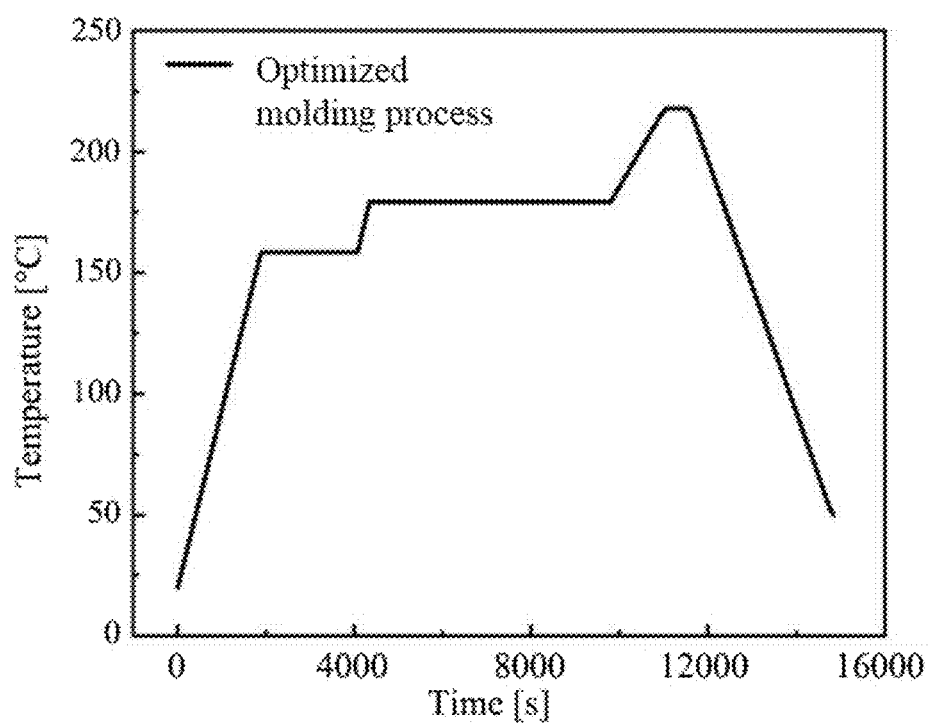
Figure 5:
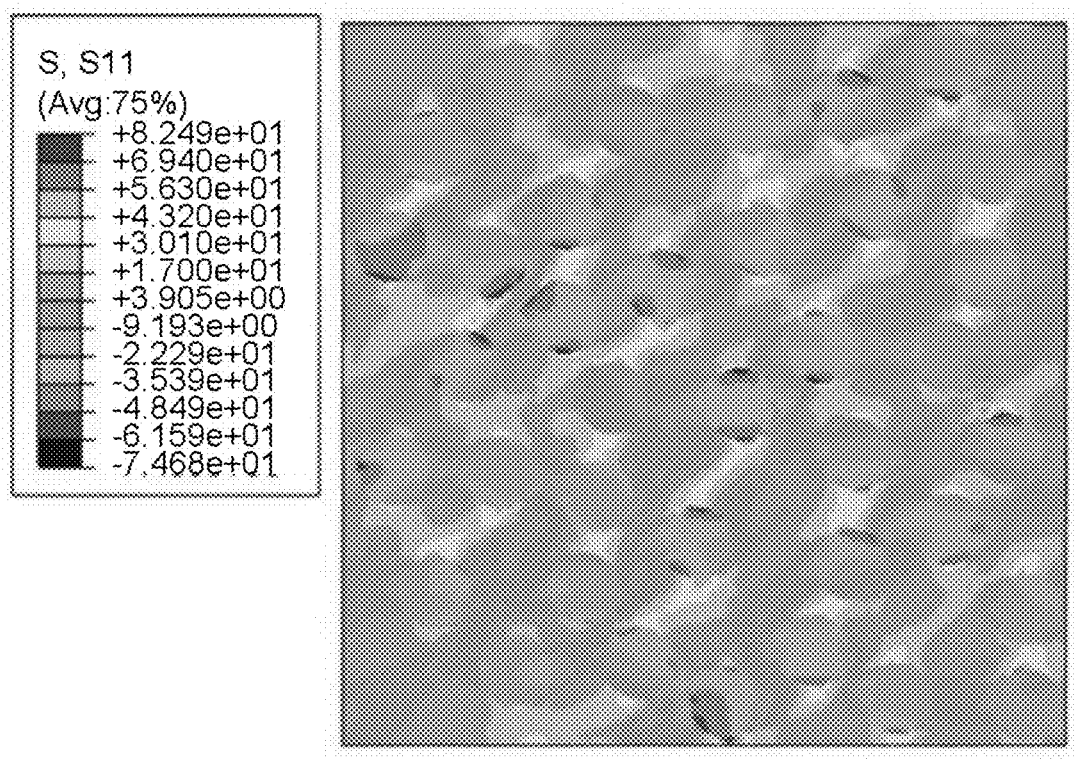

FIG. 1 is a flowchart of a method for optimizing a molding process of a part made from a fiber-reinforced polymer composite in accordance with an embodiment of the present disclosure;

FIG. 2 shows a molding process curve of a quartz fiber-reinforced cyanate ester resin composite board before optimization;

FIG. 3 shows a transverse residual stress cloud map of the quartz fiber-reinforced cyanate ester resin composite board before optimization;

FIG. 4 shows a molding process curve of the quartz fiber-reinforced cyanate ester resin composite board after optimization in accordance with an embodiment of the present disclosure; and FIG. 5 shows a transverse residual stress cloud map of the quartz fiber-reinforced cyanate ester resin composite board after optimization in accordance with an embodiment of the present disclosure.

DETAILED DESCRIPTION OF EMBODIMENTS

In order to understand the above objects, features and beneficial effects of the present disclosure more clearly, the technical solutions of the present disclosure will be further described below. It should be noted that, as long as there is no contradiction, the embodiments of the present disclosure and the features in the embodiments can be combined with each other.

Many specific details are set forth in the following description to facilitate the understanding of the present disclosure, but the present disclosure can also be implemented in other ways different from those described herein. Obviously, described herein are merely some embodiments of the present disclosure, rather than all embodiments.

The embodiments of the present disclosure are described in detail below.

EMBODIMENT

A compression molding process was adopted herein. Materials used to mold a composite part were mainly a cyanate ester resin and a quartz fiber cloth. The composite part had a size of 500×500×15 mm and 51.0% by volume fraction of the quartz fiber cloth. A diameter of a single fiber used to prepare the quartz fiber cloth was 0.75 μm. The molding process of the composite part before optimization was: holding at 150° C. for 55 min, at 185° C. for 60 min, and at 230° C. for 60 min, and then cooling to 50° C., with a heating rate and a cooling rate both of 3° C./min.

FIG. 1 was a flowchart of a method for optimizing a molding process of a part made from a fiber-reinforced polymer composite provided herein. The method included the following steps.

(S1) A Python library required for calculation was established. The Python library included an Abaqus library and a genetic algorithm library. The Abaqus library included an abaquesConstants library, a caeModules library, and an odbAccess library.

(S2) Simultaneous minimization of molding time, temperature gradient, and residual stress was set as an optimization goal.

(S3) A variable interval for holding temperature, heating rate, and cooling rate among molding process parameters was set, with variable value ranges shown in Table 1, and then values were assigned to the variables using a random function.

TABLE 1

| Multi-objective optimization variable value ranges | |
|---|---|
| Parameters | Variable range |
| $r_1$, $r_2$, $r_3$ [° C./min] | 0.5-5.0 |
| $r_4$ [° C./min] | −0.5 to −5.0 |

TABLE 1-continued

Multi-objective optimization variable value ranges

| Parameters | Variable range |
|---|---|
| $t_1, t_2, t_3$ [min] | 1.0-400.0 |
| $T_1$ [° C.] | 80.0-170.0 |
| $T_2$ [° C.] | 170.0-200.0 |
| $T_3$ [° C.] | 200.0-260.0 |

In Table 1, $r_1$, $r_2$ and $r_3$ are heating rates, $r_4$ is a cooling rate, $t_1$, $t_2$ and $t_3$ are holding times, and $T_1$, $T_2$ and $T_3$ are holding temperatures.

(S4) A macroscopic thermochemical model of the part was established according to dimensions and molding environment of the part by using a finite element method. A material property was assigned to the macroscopic thermochemical model, with specific values shown in Table 2. Evolution of temperature and curing degree of the composite during the molding process was analyzed by using a heat transfer analysis module. The macroscopic thermochemical model was rewritten into a thermochemical model function of the molding process parameters, where a temperature boundary was applied by transmitting curing process parameters to a first subroutine, and the curing process parameters are randomly generated. The first subroutine was imported followed by job submission. The first subroutine was DISP, HETVAL, and USDFLD. A minimum curing degree in the macroscopic thermochemical model was extracted from the calculation results. A maximum temperature gradient during the molding process was calculated. Temperature-time data at a center of the part was exported.

TABLE 2

Thermochemical parameters of a quartz fiber-reinforced cyanate ester resin composite

| Parameters | Value |
|---|---|
| $\rho$ [kg/m$^3$] | 1680 |
| C [J/kg · K] | 783.43 |
| $K_x = K_y$ [W/m · K] | 0.50503 |
| $K_z$ [W/m · K] | 0.32775 |

In Table 2, $\rho$ represents a density of the composite, C represents a specific heat capacity of the composite, $K_x$ is a thermal conductivity of the composite in an x-direction, $K_y$ is a thermal conductivity of the composite in a y-direction, and $K_z$ is a thermal conductivity of the composite in a z-direction.

(S5) Based on the proportion of individual components (the resin and the fiber) and size of the fiber in the composite, a two-dimensional RVE model was established by using a Python script, with thermomechanics parameters shown in Table 3. An elastic modulus change of the resin during the molding process was analyzed by using a CHILE model. Stress and strain transformations during the molding process was analyzed by using a static general module. A microscopic-thermomechanics model in the two-dimensional RVE model was rewritten into a thermomechanics model function of the curing process parameters, and the temperature-time data exported in step (S4) was simultaneously incorporated into the two-dimensional RVE model as a predefined field. A second subroutine was imported followed by job submission. The second subroutine was an Abaqus user subroutine. The residual stress was extracted for calculation results of Abaqus.

TABLE 3

Thermomechanics parameters of the quartz fiber-reinforced cyanate ester resin composite

| Materials | Parameters | Value |
|---|---|---|
| Cyanate ester resin | $E_r^0$ [GPa] | 0.33 |
| | $E_r^\infty$ [GPa] | 3.3 |
| | $v_r$ | 0.35 |
| | $CTE_r$ [K$^{-1}$] | 46.12 × 10$^{-6}$ |
| | $\beta$ | 0.017 |
| | $T_g$ [° C.] | 245.6 |
| | $T_{C1}$ | −45.7 |
| | $T_{C2}$ | −12.0 |
| Quartz fiber | $E_{1f}$ [GPa] | 74.2 |
| | $E_{2f} = E_{3f}$ [GPa] | 47.6 |
| | $G_{12f} = G_{13f}$ [GPa] | 40.8 |
| | $G_{23f}$ [GPa] | 13.6 |
| | $CTE_{1f}$ [K$^{-1}$] | 0.68 × 10$^{-6}$ |
| | $CTE_{2f} = CTE_{3f}$ [K$^{-1}$] | 4.2 × 10$^{-6}$ |
| | $v_f$ | 0.17 |

In Table 3, $E_r^0$ represents an elastic modulus of the resin before curing, $E_r^\infty$ represents an elastic modulus of the resin after complete curing, $v_r$ represents a Poisson's ratio of the resin, $T_g$ represents a glass transition temperature of the resin, $CTE_r$ represents a thermal expansion coefficient of the resin, $\beta$ represents a curing shrinkage coefficient of the resin, $T_{C1}$ and $T_{C2}$ represent two critical temperature differences, when the temperature is within this critical temperature range, the elastic modulus of the resin changes nonlinearly, $E_{1f}$ represents an elastic modulus of the fiber along a fiber length direction, $E_{2f}$ represents an elastic modulus of the fiber along a direction perpendicular to the fiber length direction, $G_{12f}$, $G_{23f}$ and $G_{13f}$ represent a shear modulus of the fiber in xy-, yz- and xz-directions respectively, $CTE_{1f}$, $CTE_{2f}$ and $CTE_{3f}$ represent thermal expansion coefficients of the fiber in x-, y- and z-directions respectively, and vf represents a Poisson's ratio of the fiber.

(S6) A total time of the molding process was calculated, where the total time included a heating time, a holding time, and a cooling time.

(S7) A dynamic penalty function was written. A violation-constrained molding process parameter among the molding process parameters was evaluated using the dynamic penalty function.

(S8) A main function of a genetic algorithm was written using a non-dominated sorting genetic algorithm II (NSGA-II). A population size, the number of generations, a crossover distribution index, and a mutation distribution index were defined, with parameter values shown in Table 4. The thermochemical model function, the thermomechanics model function, and the dynamic penalty function were called to evaluate individual fitness.

TABLE 4

NSGA-II algorithm parameters

| Parameters | Value |
|---|---|
| Population size | 100 |
| Number of generations | 80 |
| Crossover distribution index | 8 |
| Mutation distribution index | 8 |

(S9) A multi-objective optimized Pareto optimal solution set was plotted according to the individual fitness.

According to actual needs of the composite part, a set of optimal compression molding process parameters was selected from multiple sets of molding process parameters provided by the Pareto optimal solution set, i.e., holding at 158.8° C. for 37.4 min, at 180.2° C. for 91.2 min, and at 217.9° C. for 10.6 min; and a first heating rate of 4.5° C./min, a second heating rate of 4.6° C./min, a third heating rate of 2.0° C./min, and a cooling rate of 3.1° C./min.

As shown in FIGS. 2-5, compared with the part manufactured by the molding process before optimization, the maximum temperature gradient and residual stress of the part in the Embodiment of the present disclosure was reduced by 41.4% and 25.2%, respectively. At the same time, the curing cycle was shortened to 246.6 min, and the curing time was shortened by 20.0%. This indicated that the simplified optimization method of the present disclosure facilitates efficient molding of high-quality parts.

The embodiments described above are merely illustrative of the present application, and are intended to enable those skilled in the art to understand or implement the present disclosure, instead of limiting the scope of the present application. Although detailed descriptions have been made with reference to the above embodiments, modifications to the technical solutions recited in the above embodiments, or equivalent substitutions for some or all of the technical features made by those of ordinary skill in the art without departing from the spirit of the disclosure shall fall within the scope of the disclosure defined by the appended claims.

What is claimed is:

1. A method for molding a part made of a fiber-reinforced polymer composite, comprising:
heating the fiber-reinforced polymer composite to a predetermined temperature at a predetermined heating rate;
keeping the fiber-reinforced polymer composite at the predetermined temperature for a predetermined duration; and
cooling the fiber-reinforced polymer composite at a predetermined cooling rate to produce the part with reduced manufacturing cost and improved molding part quality;
wherein the predetermined temperature, the predetermined heating rate, the predetermined duration and the predetermined cooling rate are determined through the following steps:
(S1) establishing a Python library required for calculation; wherein the Python library comprises an Abaqus library and a genetic algorithm library, and the Abaqus library comprises an abaquesConstants library, a caeModules library, and an odbAccess library;
(S2) setting simultaneous minimization of the predetermined duration, temperature gradient, and residual stress as an optimization goal;
(S3) setting a variable interval for the predetermined temperature, the predetermined heating rate, and the predetermined cooling rate among molding process parameters followed by assigning values to the predetermined temperature, the predetermined heating rate, and the predetermined cooling rate using a random function;
(S4) establishing a macroscopic thermochemical model of the part according to dimensions and molding environment of the part by using a finite element method, and assigning a material property to the macroscopic thermochemical model; analyzing evolution of temperature and curing degree of the fiber-reinforced polymer composite during the molding process of the part by using a heat transfer analysis module; rewriting the macroscopic thermochemical model into a thermochemical model function of the molding process parameters, wherein a temperature boundary is applied by transmitting curing process parameters to a first subroutine, and the curing process parameters are randomly generated; importing the first subroutine followed by job submission to output calculation results; extracting a minimum curing degree in the macroscopic thermochemical model from the calculation results; calculating a maximum temperature gradient during the molding process; and exporting temperature-time data at a center of the part;
(S5) establishing a two-dimensional representative volume element (RVE) model by using a Python script from the Python library based on a proportion of individual components and size of a fiber in the fiber-reinforced polymer composite; analyzing an elastic modulus change of a resin of the fiber-reinforced polymer composite during the molding process by using a cure hardening instantaneous linear elastic (CHILE) model; analyzing stress and strain transformations during the molding process by using a static general module; rewriting a microscopic thermomechanics model in the two-dimensional RVE model into a thermomechanics model function of the curing process parameters and simultaneously incorporating the temperature-time data exported in step (S4) as a predefined field into the two-dimensional RVE model; importing a second subroutine followed by job submission, wherein the second subroutine is an Abaqus user subroutine; and extracting the residual stress from calculation results of Abaqus;
(S6) calculating a total time of the molding process; wherein the total time comprises a heating time, the predetermined duration, and a cooling time;
(S7) writing a dynamic penalty function, and evaluating a violation-constrained molding process parameter among the molding process parameters using the dynamic penalty function;
(S8) writing a main function of a genetic algorithm, defining a population size, the number of generations, a crossover distribution index, and a mutation distribution index; and calling the thermochemical model function, the thermomechanics model function, and the dynamic penalty function to evaluate individual fitness; and
(S9) plotting a multi-objective optimized Pareto optimal solution set according to the individual fitness, and selecting a set of molding process parameters satisfying actual needs from multiple sets of molding process parameters provided by the multi-objective optimized Pareto optimal solution set, wherein the set of molding process parameters comprises the predetermined temperature, the predetermined heating rate, the predetermined duration and the predetermined cooling rate.

2. The method of claim 1, wherein in step (S4), the first subroutine is DISP, HETVAL, and USDFLD.

3. The method of claim 1, wherein in step (S5), the Abaqus user subroutine is UMAT, USDFLD, and UEXPAN.

4. The method of claim 1, wherein in step (S8), the genetic algorithm is a non-dominated sorting genetic algorithm II (NSGA-II).

5. The method of claim 1, wherein the resin is selected from the group consisting of an epoxy resin, a furan resin, a cyanate ester resin, a silicone resin, a phenolic resin and a combination thereof.

6. The method of claim 1, wherein the fiber is selected from the group consisting of a carbon fiber, a quartz fiber, an aramid fiber, a metal fiber and a combination thereof.

7. The method of claim 1, wherein the molding process is a compression molding process or a resin transfer molding process.

* * * * *